US012579820B2

(12) United States Patent
Hosomi et al.

(10) Patent No.: US 12,579,820 B2
(45) Date of Patent: Mar. 17, 2026

(54) LEARNING APPARATUS AND LEARNING METHOD

(71) Applicants: HONDA MOTOR CO., LTD., Tokyo (JP); KEIO UNIVERSITY, Tokyo (JP)

(72) Inventors: Naoki Hosomi, Wako (JP); Teruhisa Misu, San Jose, CA (US); Shumpei Hatanaka, Yokohama (JP); Wei Yang, Yokohama (JP); Komei Sugiura, Yokohama (JP)

(73) Assignees: HONDA MOTOR CO., LTD., Tokyo (JP); KEIO UNIVERSITY, Tokyo (JP)

( * ) Notice: Subject to any disclaimer, the term of this patent is extended or adjusted under 35 U.S.C. 154(b) by 323 days.

(21) Appl. No.: 18/213,980

(22) Filed: Jun. 26, 2023

(65) Prior Publication Data

US 2024/0428597 A1     Dec. 26, 2024

(51) Int. Cl.
    *G06V 20/58*        (2022.01)
    *G06V 10/80*        (2022.01)
            (Continued)

(52) U.S. Cl.
    CPC ............ *G06V 20/58* (2022.01); *G06V 10/806* (2022.01)

(58) Field of Classification Search
    USPC ......................................... 382/103, 104, 155
    See application file for complete search history.

(56) References Cited

U.S. PATENT DOCUMENTS

| | | | |
|---|---|---|---|
| 10,977,501 B2 * | 4/2021 | Mao ........................ | G06V 20/58 |
| 11,468,688 B2 * | 10/2022 | Cheng .................... | G06V 20/58 |

(Continued)

FOREIGN PATENT DOCUMENTS

| | | |
|---|---|---|
| CN | 116310920 A | 6/2023 |
| JP | 2009193097 A | 8/2009 |

(Continued)

OTHER PUBLICATIONS

Hosomi et al., Multimodal Target Localization With Landmark-Aware Positioning for Urban Mobility, 2024 IEEE 2377-3766, IEEE Robotics and Automation Letter, vol. 10, No. 1, Jan. 2025, pp. 716-723. (Year: 2025).*

(Continued)

*Primary Examiner* — Ishrat I Sherali
(74) *Attorney, Agent, or Firm* — Thomas|Horstemeyer, LLP

(57)               ABSTRACT

A learning apparatus for performing machine learning includes an acquisition unit configured to acquire teaching data including input data and correct answer data, the input data including an input image that contains a reference object and an input text that relatively designates a target position by referring to the reference object; a generation unit configured to input the input data to a model to generate output data for specifying the target position, a reference position that is a position of the reference object, and a positional relationship of the target position with respect to the reference position; and an update unit configured to update a parameter of the model to reduce a loss obtained by inputting the output data and the correct answer data to a loss function. The loss function is based on at least two errors of a first error between the target position specified by the output data and the target position specified by the correct answer data, a second error between the reference position specified by the output data and the reference position specified by the correct answer data, and a third error between the positional relationship specified by the output data and the positional relationship specified by the correct answer data.

10 Claims, 6 Drawing Sheets

(51) Int. Cl.
    *G06V 10/82*           (2022.01)
    *G06V 20/56*           (2022.01)

(56)           References Cited

U.S. PATENT DOCUMENTS

| | | | | |
|---|---|---|---|---|
| 11,574,142 | B2 * | 2/2023 | Lin | G06F 18/214 |
| 11,663,294 | B2 * | 5/2023 | Liu | G06V 30/153 |
| | | | | 382/159 |
| 11,978,271 | B1 * | 5/2024 | Kharbanda | G06V 20/20 |
| 12,254,707 | B2 * | 3/2025 | Xue | G06V 20/63 |
| 12,271,792 | B2 * | 4/2025 | Li | G06N 20/00 |
| 12,394,085 | B2 * | 8/2025 | Chen | G06V 20/58 |
| 2020/0202145 | A1 | 6/2020 | Mao et al. | |
| 2021/0326609 | A1 | 10/2021 | Mao et al. | |
| 2024/0257536 | A1 * | 8/2024 | Ferroni | G06V 20/70 |
| 2025/0095393 | A1 * | 3/2025 | Yang | G06F 40/205 |

FOREIGN PATENT DOCUMENTS

| | | |
|---|---|---|
| JP | 2015149013 A | 8/2015 |
| JP | 2022-513866 A | 2/2022 |
| WO | 2020/132082 A1 | 6/2020 |
| WO | 2023101679 A1 | 6/2023 |

OTHER PUBLICATIONS

Dou et al., Coarse-to-Fine Vision-Language Pre-training with Fusion in the Backbone, Nov. 18, 2022, https://arxiv.org/pdf/2206.07643.pdf.

Hatanaka, S. et al., Target Position Prediction Using UNITER Regressor for Understanding Navigation Instructions in Urban Areas, Keio University, Honda R&D Co., Ltd., Honda Research Institute USA, Aug. 19, 2022, pp. 34-39.

International Search Report for PCT/JP2024/018221 dated Jul. 23, 2024.

* cited by examiner

F I G. 1
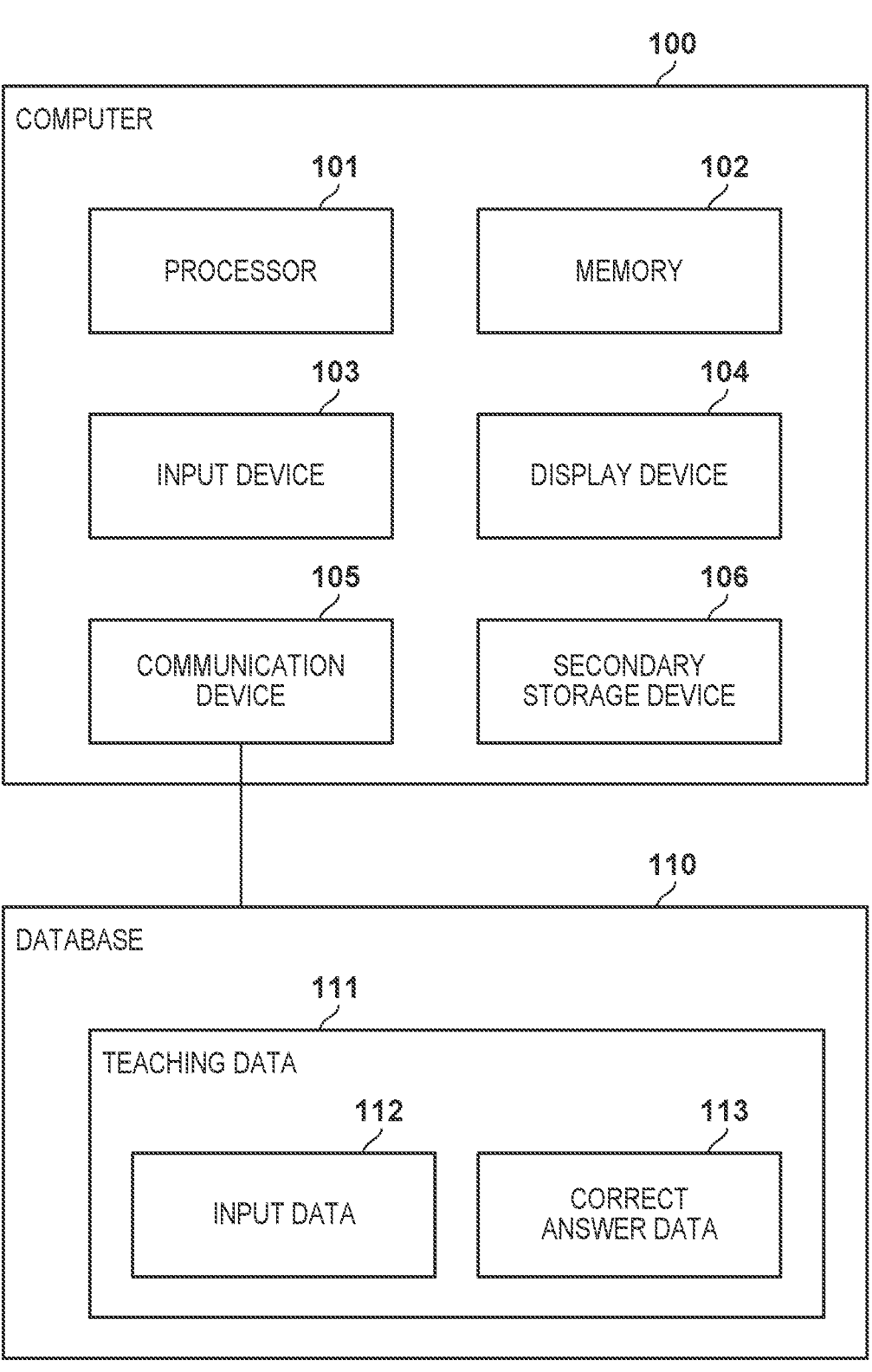

PARK IN FRONT OF RIGHT BLACK VEHICLE

F I G. 5
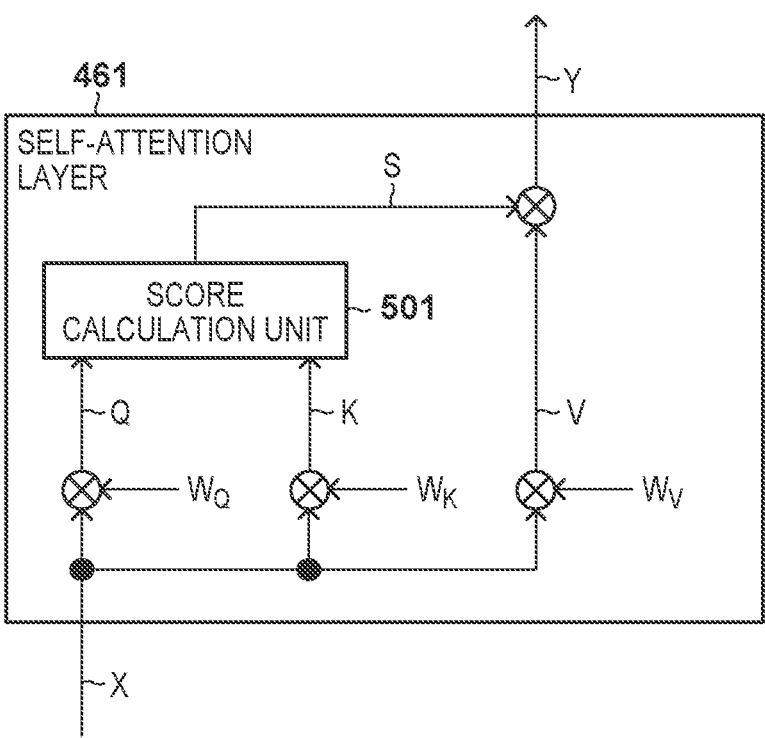
F I G. 6
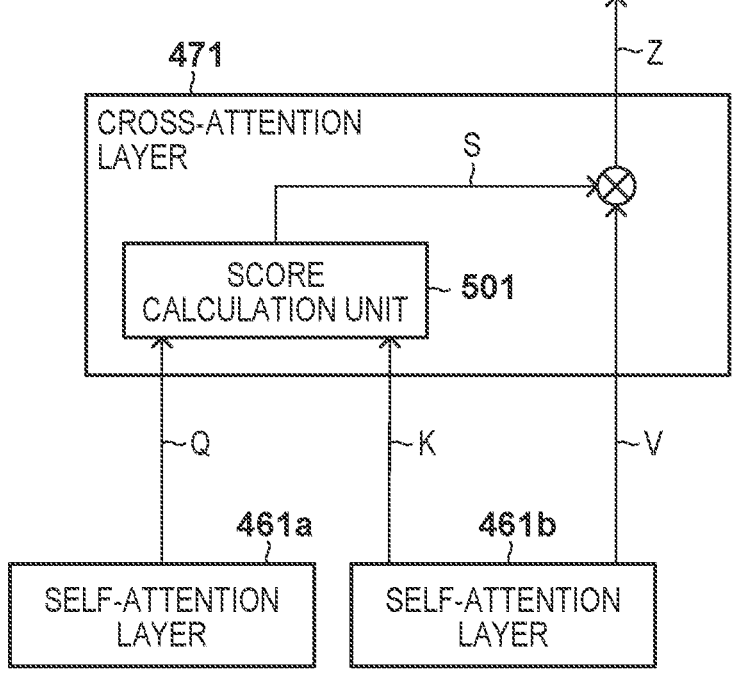

F I G. 7
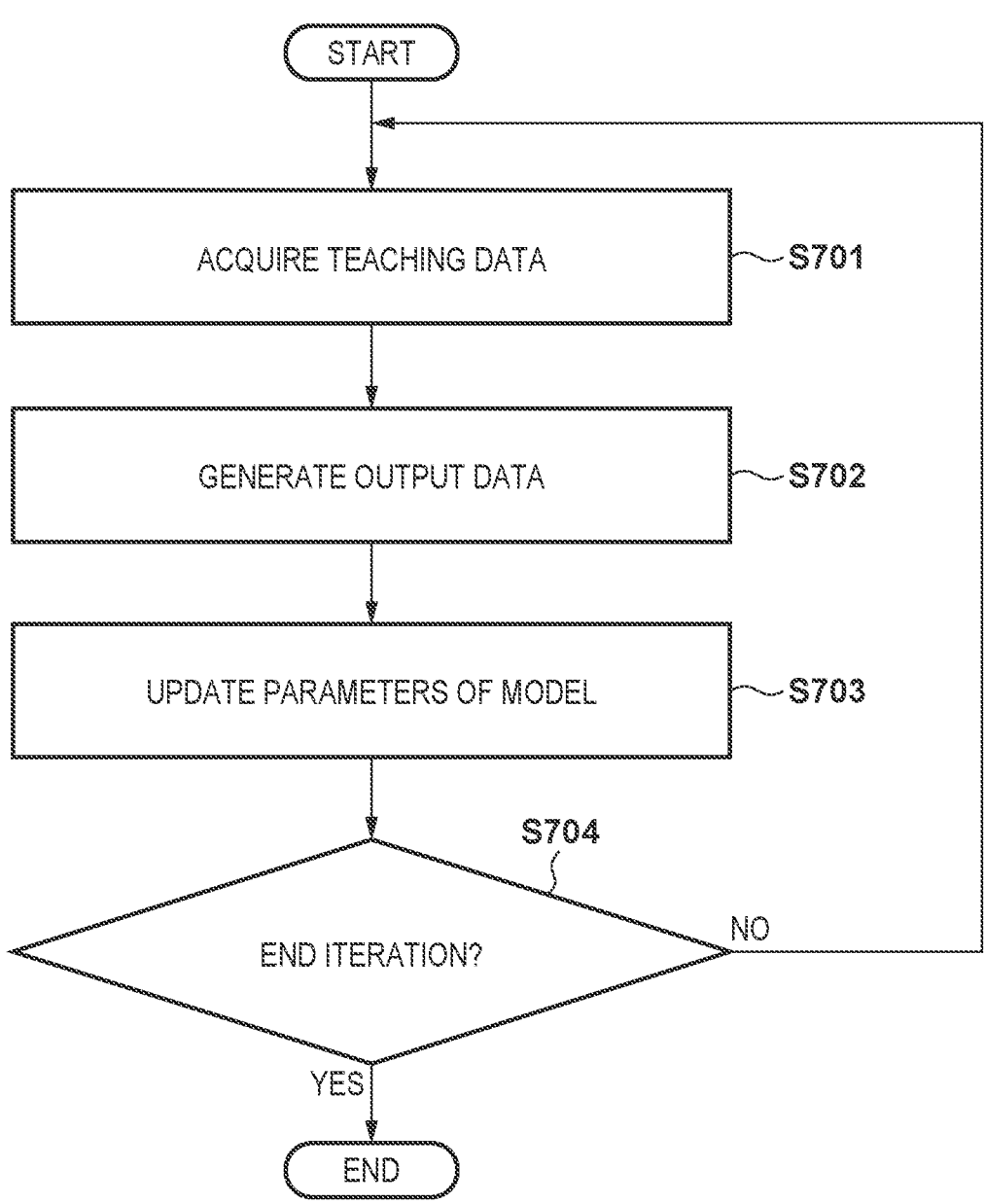

LEARNING APPARATUS AND LEARNING METHOD

BACKGROUND OF THE INVENTION

Field of the Invention

The present invention relates to a learning apparatus and a learning method.

Description of the Related Art

Various techniques for performing traveling control of a vehicle by using a model generated by machine learning have been proposed. Japanese Patent Laid-Open No. 2022-513866 describes that a neural network is learned by using sensor data acquired by a vehicle. Zi-Yi Dou, et al., "Coarse-to-Fine Vision-Language Pre-training with Fusion in the Backbone", Nov. 18, 2022, arXiv (https://arxiv.org/pdf/2206.07643.pdf) describes a model using, as inputs, an image and a language.

SUMMARY OF THE INVENTION

It may be useful to train a model for inferring a target position by using, as input data, an image and a text that designates the target position by referring to an object included in the image. An aspect of the present invention provides a technique for generating a model capable of accurately inferring a target position. According to some embodiments, a learning apparatus for performing machine learning, comprising: an acquisition unit configured to acquire teaching data including input data and correct answer data, the input data including an input image that contains a reference object and an input text that relatively designates a target position by referring to the reference object; a generation unit configured to input the input data to a model to generate output data for specifying the target position, a reference position that is a position of the reference object, and a positional relationship of the target position with respect to the reference position; and an update unit configured to update a parameter of the model to reduce a loss obtained by inputting the output data and the correct answer data to a loss function, wherein the loss function is based on at least two errors of a first error between the target position specified by the output data and the target position specified by the correct answer data, a second error between the reference position specified by the output data and the reference position specified by the correct answer data, and a third error between the positional relationship specified by the output data and the positional relationship specified by the correct answer data is provided.

BRIEF DESCRIPTION OF THE DRAWINGS

FIG. 1 is a block diagram for describing a hardware configuration example of a computer according to some embodiments;

FIG. 5 is a schematic diagram for describing a configuration example of a self-attention layer according to some embodiments;

FIG. 6 is a schematic diagram for describing a configuration example of a cross-attention layer according to some embodiments; and FIG. 7 is a flowchart for describing an example of a learning method according to some embodiments.

DESCRIPTION OF THE EMBODIMENTS

Figure 2:
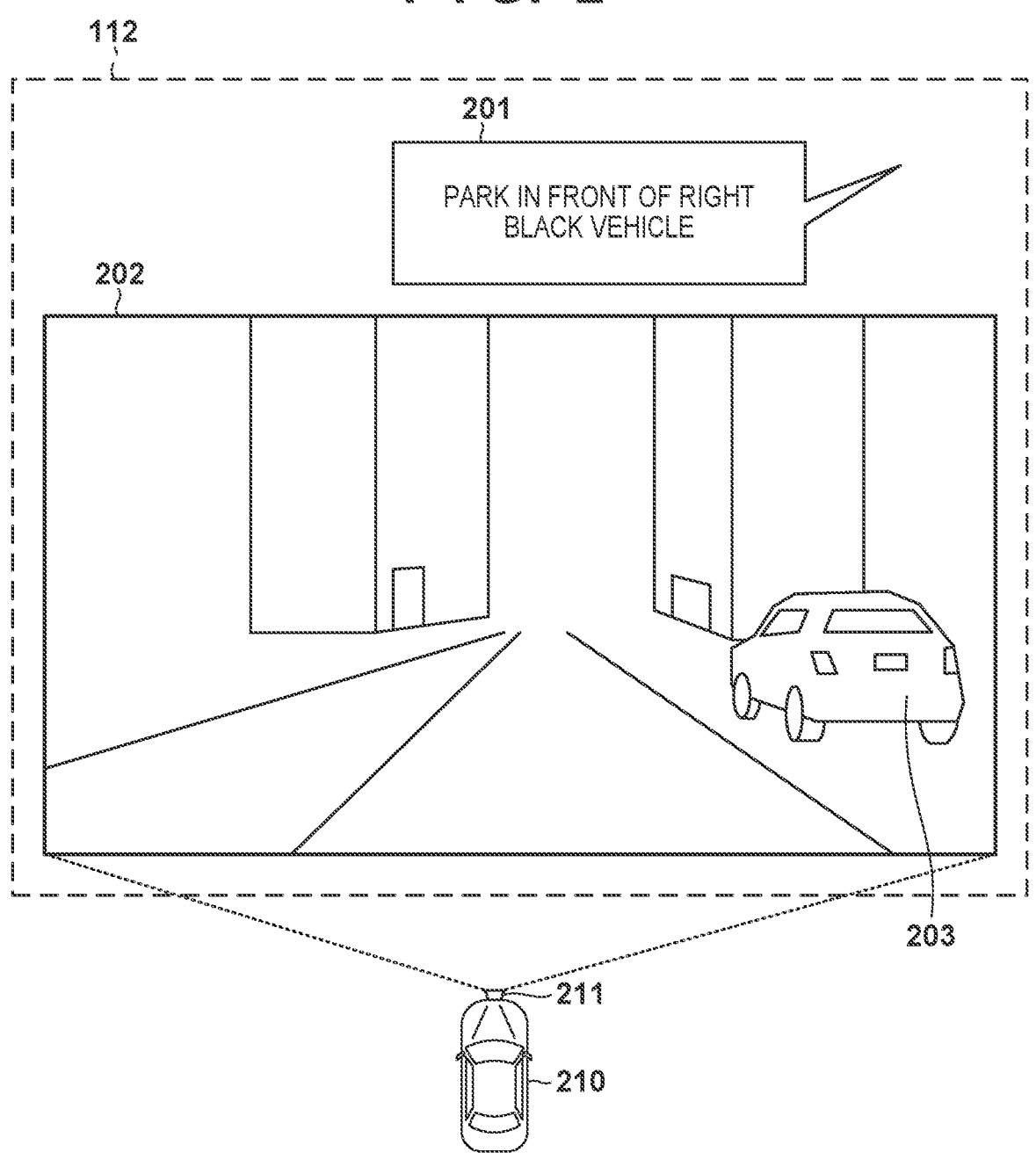
FIG. 2 is a schematic diagram for describing an example of input data according to some embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

A hardware configuration example of a computer 100 according to some embodiments will be described with reference to FIG. 1. As described in detail below, the computer 100 is used to train a model by machine learning. Thus, the computer 100 may be referred to as a learning apparatus. The computer 100 may be, for example, a server computer or a personal computer (for example, a desktop type or a laptop type). The computer 100 may be a computer resource disposed on a cloud environment.

The computer 100 may have a hardware device illustrated in FIG. 1. A processor 101 controls an overall operation of the computer 100. The processor 101 may be, for example, a central processing unit (CPU), a graphics processing unit (GPU), or a combination thereof. The processor 101 may be a single processor, or may be a set of a plurality of processors connected to be capable of communicating with each other.

A memory 102 stores programs and data used for processing of the computer 100. The memory 102 may be, for example, a combination of a random-access memory (RAM) and a read-only memory (ROM).

An input device 103 is a device for acquiring an instruction from a user of the computer 100. The input device 103 may be, for example, a combination of one or more of a keyboard, a button, a touch pad, and a microphone. A display device 104 is a device for visually presenting information to the user of the computer 100. The display device 104 may be, for example, a dot matrix display such as a liquid crystal display. The computer 100 may have a device (for example, the touch screen) in which the input device 103 and the display device 104 are integrally formed. The input device 103 and the display device 104 may be outside the computer. In this case, the computer 100 may have an interface for communicating with the external input device 103 and the external display device 104.

A communication device 105 is a device for communicating with a device outside the computer 100. In a case where the computer 100 performs wired communication, the communication device 105 may be a network interface card (NIC) having a connector for connecting a cable. In a case where the computer 100 performs wireless communication, the communication device 105 may be a wireless communication module including an antenna and a baseband processing circuit.

A secondary storage device 106 is a device for storing programs and data used for processing of the computer 100 in a nonvolatile manner. The secondary storage device 106 is, for example, a hard disk drive (HDD) or a solid-state drive (SSD).

The computer 100 may be capable of communicating with an external database 110. The database 110 may store teaching data 111 used for machine learning by the computer 100. The computer 100 may acquire the teaching data 111 from the database 110. Alternatively or additionally, the teaching data 111 may be stored in the secondary storage device 106 of the computer 100. In machine learning, a plurality of pieces of different teaching data 111 are used. Two pieces of teaching data 111 being different may mean that pieces of input data 112 included in the pieces of teaching data 111 are different (for example, at least input texts 201 or input images 202 to be described later are different). A part of the pieces of teaching data 111 may be used as verification data and test data.

The teaching data 111 includes the input data 112 and correct answer data 113. The input data 112 may be data input to a model in order to train the model (for example, a model 400 of FIG. 4). The correct answer data 113 may be data to be output by this model.

An example of the input data 112 will be described with reference to FIG. 2. The input data 112 may include a pair of an input image 202 that contains a reference object 203 and an input text 201 that relatively designates a target position by referring to the reference object 203.

The input image 202 may be any image including an object. The input image 202 may be an image imaged by a camera 211 of a vehicle 210. For example, the input image 202 may be an image imaged by the camera 211 attached to the vehicle to image the front of the vehicle 210. Alternatively, the input image 202 may be an image imaged by a camera attached to the vehicle to image another direction (for example, rearward) of the vehicle 210. The camera 211 of the vehicle 210 may be the camera 211 attached to the vehicle 210 or a camera (for example, a smartphone of an occupant of the vehicle) brought into the vehicle. The input image 202 may be an image that is not related to the vehicle.

The reference object 203 may be any object included in the input image 202. In the example of FIG. 2, a vehicle is used as the reference object 203. Alternatively, the reference object 203 may be a traffic participant other than a vehicle, a road sign, a traffic light, a guardrail, an intersection, a crosswalk, or the like.

The input text 201 may be expressed in natural language, for example, "park in front of right black vehicle". In this example, the "right black vehicle" of the input text 201 designates the reference object 203 and the "in front of" of the input text 201 relatively designates a target position with respect to the reference object 203. The input text 201 may be expressed in other forms instead of being expressed in natural language. For example, the input text 201 may be selected from among a plurality of candidates for a combination of a preset reference object and a positional relationship.

Figure 3:
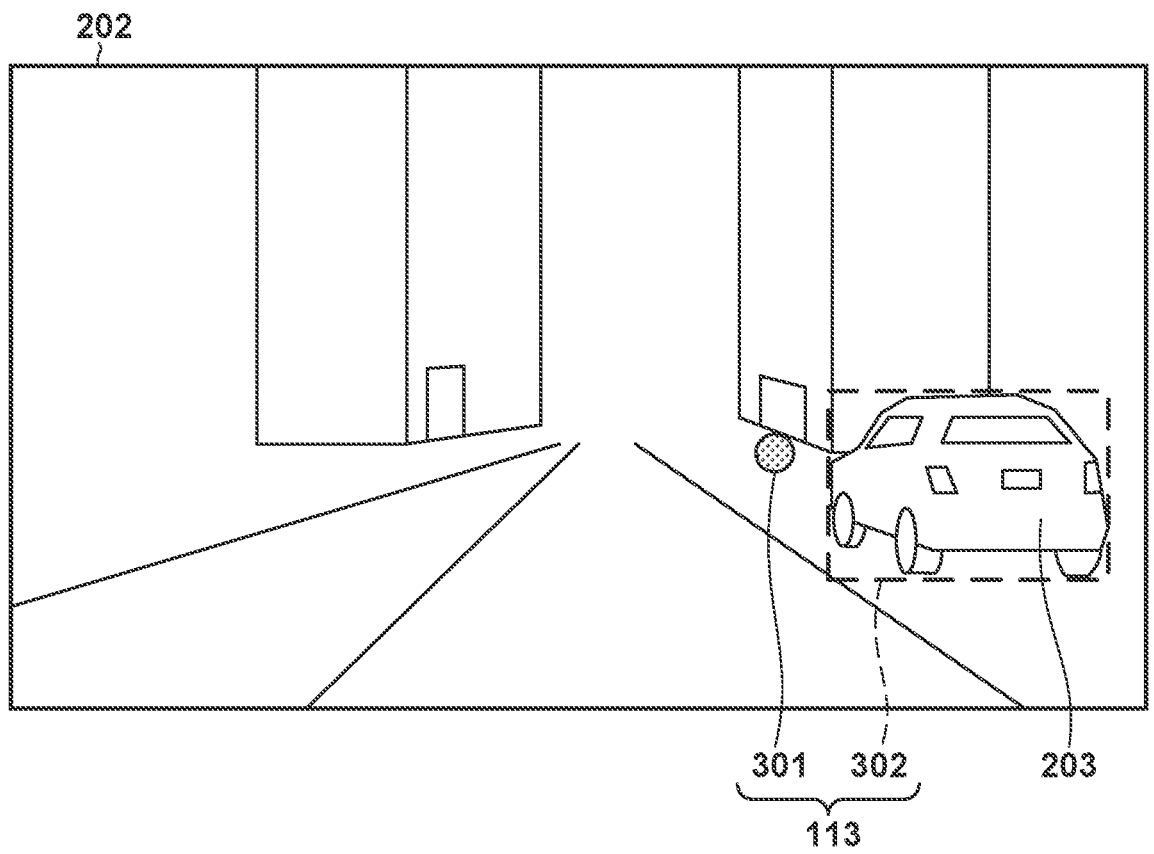
FIG. 3 is a schematic diagram for describing an example of correct answer data according to some embodiments.

An example of the correct answer data 113 will be described with reference to FIG. 3. The correct answer data 113 may be data for specifying a target position designated by the input text 201, a reference position that is a position of the reference object 203, and a positional relationship of the target position with respect to the reference object 203. The correct answer data 113 may be manually set for the input data 112 or may be set by the computer. In the example of FIG. 3, the correct answer data 113 includes a point 301 in the input image 202 and a region 302 in the input image 202. The target position designated by the input text 201 is specified by the point 301. For example, the point 301 may be the target position. Alternatively, a region with the point 301 as a center may be the target position. The point 301 may be represented by components for respective directions in a two-dimensional coordinate system (hereinafter, simply referred to as a "coordinate system of the input image 202") set in the input image 202.

The reference position that is the position of the reference object 203 is specified by the region 302. For example, the region 302 may be the reference position. The region 302 may be a rectangle having an outer edge circumscribing the reference object 203. The region 302 may be represented by a center, a width, and a height. The center of the region 302 may be represented by the components for the respective directions in the coordinate system of the input image 202. Alternatively, the region 302 may be represented by coordinates of an upper left corner and coordinates of a lower right corner. The region 302 may be other than a rectangle, and may be, for example, a circle. The shape of the region 302 may vary depending on a shape of the reference object 203.

The positional relationship of the target position with respect to the reference object 203 is specified by the point 301 and the region 302. For example, the positional relationship may be represented by two-dimensional vectors from the center of the region 302 toward the point 301. This vector may be represented by the components for the respective directions in the coordinate system of the input image 202.

In the above example, the correct answer data 113 includes the point 301 and the region 302. Alternatively, the correct answer data 113 may include the region 302 and the two-dimensional vectors. In this case, the target position designated by the input text 201 may be specified by a point moved from the center of the region 302 by the two-dimensional vector. Alternatively, the correct answer data 113 may include the point 301 and two two-dimensional vectors. The upper left corner and the upper right corner of the region 302 may be specified by points moved from the point 301 by the two two-dimensional vectors.

In the above example, the correct answer data 113 explicitly represents two pieces of information of three pieces of information of the target position designated by the input text 201, the reference position that is the position of the reference object 203, and the positional relationship of the target position with respect to the reference object 203, and the remaining information is determined from these two pieces of information. Alternatively, the correct answer data 113 may explicitly represent these three pieces of information.

Figure 4:
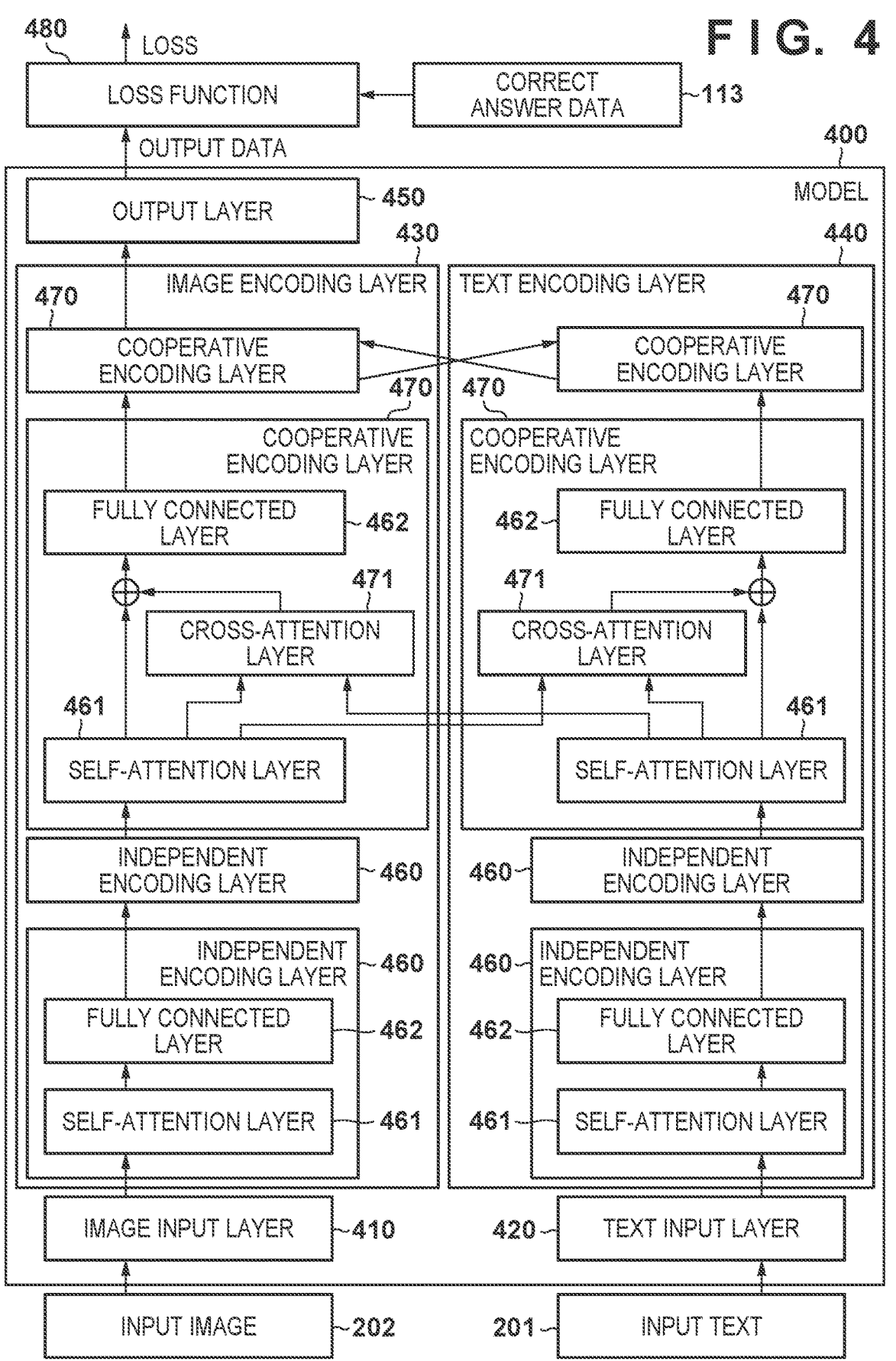
FIG. 4 is a schematic diagram for describing a configuration example of a model according to some embodiments.

The model 400 on which machine learning is performed by the computer 100 will be described with reference to FIG. 4. Based on the input data 112, the model 400 generates output data for specifying the target position designated by the input text 201, the reference position that is the position of the reference object 203, and the positional relationship of the target position with respect to the reference object 203. The model 400 may have any structure that influences the output data of the model by both the input text 201 and the input image 202 included in the input data 112 being processed by parameters of the model. The model 400 in FIG. 4 is an example of such a model.

The model 400 includes an image input layer 410, a text input layer 420, an image encoding layer 430, a text encoding layer 440, and an output layer 450. The image input layer 410 converts the input image 202 into a format to be input to the image encoding layer 430. For example, the image input layer 410 converts the input image 202 into a plurality of vectors. For example, the image input layer 410 may divide the input image 202 into a plurality of patch images and may rearrange pixel values of the patch images into one-dimensional vectors.

The image encoding layer 430 encodes the input image 202 (specifically, input image 202 expressed as the plurality of vectors) input from the image input layer 410. A specific configuration of the image encoding layer 430 will be described later. The output layer 450 generates, based on the data encoded by the image encoding layer 430, the output data for specifying the target position designated by the input text 201, the reference position that is the position of the reference object 203, and the positional relationship of the target position with respect to the reference object 203. The output data of the model 400 may have the same configuration as the correct answer data 113 described above. For example, the output data of the model 400 may be the point 301 and the region 302. As will be described later, a matrix in which a plurality of row vectors are combined is output from the image encoding layer 430. The output layer 450 may calculate one-dimensional column vectors by multiplying the output matrix by a weight matrix from the right. This weight matrix is one of parameters determined by machine learning. A plurality of components of the calculated column vectors are coordinate values of the point 301 and a value for specifying the region 302.

A specific configuration of the image encoding layer 430 will be described. The image encoding layer 430 may include one or more independent encoding layers 460 (two in the example of FIG. 4) and one or more cooperative encoding layers 470 (two in the example of FIG. 4). In a case where the image encoding layer 430 includes a plurality of independent encoding layers 460, these independent encoding layers may be connected in series. In a case where the image encoding layer 430 includes a plurality of cooperative encoding layers 470, the cooperative encoding layers may be connected in series. One or more independent encoding layers 460 may be collectively disposed in a first half of the image encoding layer 430, and one or more cooperative encoding layers 470 may be collectively disposed in a second half of the image encoding layer 430. Alternatively, the independent encoding layers 460 and the cooperative encoding layers 470 may be disposed in a mixed manner.

The independent encoding layers 460 included in the image encoding layer 430 encode a plurality of vectors input from a previous layer in the image encoding layer 430 without using, as inputs, features determined by the text encoding layer 440. The independent encoding layer 460 may include a self-attention layer 461 and a fully connected layer 462.

The plurality of vectors input to the independent encoding layers 460 are converted into a plurality of different vectors by the self-attention layers 461. The plurality of vectors output from the self-attention layers 461 are converted into a plurality of different vectors by the fully connected layers 462. The plurality of vectors output from the fully connected layers 462 are output from the independent encoding layer 460.

Each of the plurality of output vectors of the self-attention layers 461 represents a relationship of another input vector with respect to each input vector in the plurality of input vectors of the self-attention layers 461. A specific configuration of the self-attention layer 461 will be described with reference to FIG. 5. The self-attention layer 461 combines a plurality of input row vectors into one two-dimensional input matrix X. The self-attention layer 461 calculates a query Q, a key K, and a value V by multiplying the input matrix X by a weight matrix $W_Q$, a weight matrix $W_K$, and a weight matrix $W_V$ from the right. The weight matrix $W_Q$, the weight matrix $W_K$, and the weight matrix $W_V$ are parameters determined by machine learning.

The self-attention layer 461 includes a score calculation unit 501. The score calculation unit 501 calculates a score S based on the query Q and the key K. Specifically, the score calculation unit 501 calculates an intermediate matrix by multiplying the query Q by a transposed matrix of the key K from the right and dividing each component by a predetermined value (for example, a square root of the number of columns of the key K). Thereafter, the score calculation unit 501 calculates the score S by applying a Softmax function to each row of the intermediate matrix. Thereafter, the self-attention layer 461 calculates a matrix Y by multiplying the score S by the value V from the right. The self-attention layer 461 outputs the matrix Y calculated in this manner. A plurality of rows of the matrix Y correspond to a plurality of row vectors output from the self-attention layer 461.

The fully connected layer 462 outputs a plurality of different vectors by connecting all of the plurality of input vectors. For example, the fully connected layer 462 multiplies the matrix Y output from the self-attention layer 461 by the weight matrix from the right, and adds a bias vector to each row of the resulting matrix. The weight matrix and the bias vector are parameters determined by machine learning. Thereafter, the fully connected layer 462 outputs a matrix obtained by applying an activation function to each element of the matrix calculated in this manner. The weight matrix of the fully connected layer 462 has such a size that the matrix output from the fully connected layer 462 (that is, the matrix output from the independent encoding layer 460) has the same size as the input matrix of the next independent encoding layer 460.

The cooperative encoding layer 470 included in the image encoding layer 430 uses, as additional inputs, the features determined by the text encoding layer 440 to encode each of the plurality of vectors input from the previous layer in the image encoding layer 430. The cooperative encoding layer 470 may further include a cross-attention layer 471 in addition to the self-attention layer 461 and the fully connected layer 462 described above.

The plurality of vectors input to the cooperative encoding layer 470 are converted into a plurality of different vectors by the self-attention layer 461. A part of the features determined by the self-attention layer 461 is input to the cross-attention layer 471. A part of the features determined by the cooperative encoding layer 470 (specifically, the self-attention layer 461) included in the text encoding layer 440 is also input to the cross-attention layer 471. The cross-attention layer 471 generates and outputs a plurality of vectors based on these inputs.

The plurality of vectors output from the self-attention layer 461 and the plurality of vectors output from the cross-attention layer 471 are added and input to the fully connected layer 462. The fully connected layer 462 converts the plurality of input vectors into a plurality of different vectors. The plurality of vectors output from the fully connected layer 462 are output from the cooperative encoding layer 470.

Each of the plurality of output vectors of the cross-attention layer 471 represents a relationship of each of the plurality of output vectors from the self-attention layer 461 included in the image encoding layer 430 with respect to each vector of the plurality of output vectors from the self-attention layer 461 included in the text encoding layer 440.

A specific configuration of the cross-attention layer 471 will be described with reference to FIG. 6. The query Q is input to the cross-attention layer 471 from a self-attention layer 461a included in the image encoding layer 430, and the key K and the value V are input to the cross-attention layer from a self-attention layer 461b included in the text encoding layer 440. The query Q is a part of the features determined by the self-attention layer 461a. The key K and the value V are parts of the features determined by the self-attention layer 461b.

The score calculation unit 501 calculates the score S based on the query Q and the key K in the same manner as described above. Thereafter, the cross-attention layer 471 calculates a matrix Z by multiplying the score S by the value V from the right. The cross-attention layer 471 outputs the matrix Z calculated in this manner. A plurality of rows of the matrix Z correspond to a plurality of row vectors output from the cross-attention layer 471.

The text input layer 420 converts the input text 201 into a format to be input to the text encoding layer 440. For example, the text input layer 420 segments the input text 201 into a plurality of words and converts each word into a vector. For vectorization of words, for example, an existing technique such as word2vec may be used. The text encoding layer 440 encodes the input text 201 (specifically, input text 201 expressed as the plurality of vectors) input from the text input layer 420. The text encoding layer 440 may have the same layer structure as the image encoding layer 430. Alternatively, the text encoding layer 440 may have a layer structure different from a layer structure of the image encoding layer 430.

For example, text encoding layer 440 may include one or more independent encoding layers 460 (two in the example of FIG. 4) and one or more cooperative encoding layers 470 (two in the example of FIG. 4), similar to the image encoding layer 430. The independent encoding layers 460 included in the text encoding layer 440 encode a plurality of vectors input from a previous layer in the text encoding layer 440 without using, as inputs, features determined by the image encoding layer 430. The cooperative encoding layers 470 included in the text encoding layer 440 encode a plurality of vectors input from a previous layer in the text encoding layer 440 without using, as additional inputs, the features determined by the image encoding layer 430.

The output data output from the model 400 is input to a loss function 480 at the time of training the model 400. The correct answer data 113 corresponding to the input data 112 is also input to the loss function 480. The loss function 480 outputs a loss based on an error between the output data and the correct answer data 113.

An example of a learning method for training the model 400 will be described with reference to FIG. 7. Each step of the method of FIG. 7 may be processed, for example, by the processor 101 of the computer 100 executing a program read into the memory 102. Alternatively, a part or all of the steps of the method of FIG. 7 may be executed by a dedicated circuit such as an application-specific integrated circuit (ASIC). At a start point in time of FIG. 7, the parameters of the model 400 may be randomly set values.

In S701, the computer 100 acquires one piece of teaching data 111. The teaching data 111 may be read from the database 110 at this point in time, or may be stored in the secondary storage device 106 in advance. Instead of using the pieces of teaching data 111 one by one, the plurality of pieces of teaching data 111 may be collectively used as a batch.

In S702, the computer 100 generates the output data by inputting the input data 112 included in the teaching data 111 acquired in S701 to the model 400. As described above, the output data is data for specifying the target position (for example, point 301), the reference position (for example, region 302) that is the position of the reference object 203, and the positional relationship of the target position with respect to the reference position.

In S703, the computer 100 updates the parameters of the model 400 to reduce the loss obtained by inputting the output data generated in S702 and the correct answer data 113 included in the teaching data 111 acquired in S701 to the loss function 480. The parameters may be updated by using an existing method such as Adam.

The loss function 480 used in some embodiments is described in detail. The loss function 480 is based on at least two errors of (1) an error (hereinafter, a target error) between the target position specified by the output data of the model 400 and the target position specified by the correct answer data 113, (2) an error (hereinafter, a reference error) between the reference position specified by the output data of the model 400 and the reference position specified by the correct answer data 113, and (3) an error (hereinafter, a relationship error) between the positional relationship specified by the output data of the model 400 and the positional relationship specified by the correct answer data 113. For example, the loss function 480 may be based on the target error and the reference error, may be based on the target error and the relationship error, or may be based on the reference error and the relationship error. Further, the loss function 480 may be based on all of the target error, the reference error, and the relationship error. As described above, the loss function 480 is based on at least two errors of the target error, the reference error, and the relational error, and thus, the model 400 that can accurately infer the target position can be generated.

The loss function 480 used in some other embodiments is described in detail. The loss function 480 is based on (3) an error (the above-described relationship error) between the positional relationship specified by the output data of the model 400 and the positional relationship specified by the correct answer data 113. Since the relationship error is an error in the positional relationship of the target position with respect to the reference position, the relationship error is based on both the target position and the reference position. Thus, even in a case where the loss function 480 is based only on the relationship error, the model 400 that can accurately infer the target position can be generated.

In a case where the target position is represented by the point 301 as described above, the target error may be a difference between each coordinate value of the point 301 specified by the output data of the model 400 and each coordinate value of the point 301 specified by the correct answer data 113. In a case where the reference position is represented by the region 302 as described above, the reference error may be a difference between each coordinate value, width, and height of the center of the region 302 specified by the output data of the model 400 and each coordinate value, width, and height of the center of the region 302 specified by the correct answer data 113. In a case where the positional relationship between the target position and the reference position is represented by the two-dimensional vector as described above, the relational error may be a difference between each component of the two-dimensional vector specified by the output data of the model 400 and each component of the two-dimensional vector specified by the correct answer data 113.

A loss calculated by the loss function 480 may be a sum of at least two errors of a loss based on the target error, a loss based on the reference error, and a loss based on the relationship error. This sum may be a weighted sum and a coefficient of the weighted sum may be determined as a hyperparameter.

The loss based on the target error may be, for example, an L1 loss of the target error. The loss based on the reference error may be, for example, a sum of an L1 loss of the reference error and a GIoU loss of the reference error. This sum may be a weighted sum and a coefficient of the weighted sum may be determined as a hyperparameter. The loss based on the relationship error may be, for example, an L1 loss of the relationship error. The loss determination method based on each error described above is an example, and the loss may be determined by another method.

In S704, the computer 100 determines whether or not a condition (hereinafter, end condition) for ending the iteration of the parameter update is satisfied. In a case where it is determined that the end condition is satisfied ("YES" in S704), the computer ends the processing, and otherwise ("NO" in S704), the processing proceeds to S701. The end condition may be that the parameter is updated a predetermined number of times (that is, S704 is executed). After the processing of FIG. 7 is executed, the computer 100 may store the trained model 400 in the secondary storage device 106 for future processing, or may transmit the model to another device (for example, the database 110).

The parameters of the model 400 at a start point in time of training may be randomly set. Alternatively, the parameters of the model 400 at the start point in time of training may be parameters of the image encoding layer 430 determined by another machine learning in which the input image 202 is used as the input data and the position of the reference object 203 is used as the correct answer data. That is, the parameters of the model 400 may be determined by fine-tuning utilizing the parameters determined by another machine learning.

Next, a method of using the model 400 will be described. The vehicle according to some embodiments acquires a voice input from an occupant through a microphone and converts the voice input into a text. The vehicle acquires an image by imaging a landscape in front of the vehicle in response to the acquisition of the voice input. The vehicle generates the output data by inputting the text and image acquired in this manner to the model 400, and specifies the target position by using the output data. Thereafter, the vehicle executes processing designated by the voice input with respect to the target position. For example, in a case where an instruction "park in front of right black vehicle" is issued by voice input, the vehicle specifies a position in front of the right black vehicle as the target position, and controls traveling of the vehicle to stop at the target position. As described above, it is possible to simultaneously predict the target position and the reference object designated by the input text by using the model 400.

Summary of Embodiments

Item 1

A learning apparatus (100) for performing machine learning, comprising:
an acquisition unit configured to acquire teaching data (111) including input data (112) and correct answer data (113), the input data including an input image (202) that contains a reference object (203) and an input text (201) that relatively designates a target position (301) by referring to the reference object;
a generation unit configured to input the input data to a model (400) to generate output data for specifying the target position, a reference position (302) that is a position of the reference object, and a positional relationship of the target position with respect to the reference position; and
an update unit configured to update a parameter of the model to reduce a loss obtained by inputting the output data and the correct answer data to a loss function (480),
wherein the loss function is based on at least two errors of
a first error between the target position specified by the output data and the target position specified by the correct answer data,
a second error between the reference position specified by the output data and the reference position specified by the correct answer data, and
a third error between the positional relationship specified by the output data and the positional relationship specified by the correct answer data. According to this item, it is possible to generate the model capable of accurately inferring the target position.

Item 2

The learning apparatus according to Item 1, wherein the input image includes an image (211) imaged by a camera of a vehicle (210).
According to this item, it is possible to generate the model capable of accurately inferring the target position used for controlling the vehicle.

Item 3

The learning apparatus according to Item 1 or 2, wherein the input text is expressed by a natural language.
According to this item, it is possible to generate the model capable of accurately inferring the target position specified by the natural language.

Item 4

The learning apparatus according to any one of Items 1-3, wherein the loss function is based on at least the first error.
According to this item, since the loss function is based on the first error, it is possible to generate the model capable of inferring the target position with higher accuracy.

Item 5

The learning apparatus according to any one of Items 1-4, wherein the loss function is based on all of the first error, the second error, and the third error.
According to this item, it is possible to generate the model capable of inferring the target position with higher accuracy.

Item 6

The learning apparatus according to any one of Items 1-5, wherein the model includes
an image encoding layer (430) for encoding the input image, and
a text encoding layer (440) for encoding the input text,
a part of features determined by the text encoding layer is input to the image encoding layer, and a part of features determined by the image encoding layer is input to the text encoding layer.

According to this item, both the input image and the input text can be reflected in the output data.

Item 7

The learning apparatus according to Item 6, wherein the image encoding layer and the text encoding layer have an identical layer structure.

According to this item, it is easy to implement the model.

Item 8

The learning apparatus according to Item 6 or 7, wherein the machine learning of the model is first machine learning, and a parameter of the model at a start point in time of training is a parameter of the image encoding layer determined by second machine learning with the input image as input data and a position of the reference object as correct answer data.

According to this item, a training time of the model can be shortened.

Item 9

A learning apparatus (100) for performing machine learning, comprising:

an acquisition unit configured to acquire teaching data (111) including input data (112) and correct answer data (113), the input data including an input image (202) that contains a reference object (203) and an input text (201) that relatively designates a target position (301) by referring to the reference object;

a generation unit configured to input the input data to a model (400) to generate output data for specifying the target position, a reference position (302) that is a position of the reference object, and a positional relationship of the target position with respect to the reference position; and an update unit configured to update a parameter of the model to reduce a loss obtained by inputting the output data and the correct answer data to a loss function (480), wherein the loss function is based on an error between the positional relationship specified by the output data and the positional relationship specified by the correct answer data.

According to this item, it is possible to generate the model capable of accurately inferring the target position.

Item 10

A non-transitory computer readable storage medium for storing a program causing a computer to function as the learning apparatus according to any one of Items 1-9.

According to this item, the above items are provided in the form of the program.

Item 11

A learning method of performing machine learning, comprising:

a step of acquiring teaching data (111) including input data (112) and correct answer data (113), the input data including an input image (202) that contains a reference object (203) and an input text (201) that relatively designates a target position (301) by referring to the reference object;

a step of inputting the input data to a model to generate output data for specifying the target position, a reference position (302) that is a position of the reference object, and a positional relationship of the target position with respect to the reference position; and a step of updating a parameter of the model to reduce a loss obtained by inputting the output data and the correct answer data to a loss function (480), wherein the loss function is based on at least two errors of a first error between the target position specified by the output data and the target position specified by the correct answer data, a second error between the reference position specified by the output data and the reference position specified by the correct answer data, and a third error between the positional relationship specified by the output data and the positional relationship specified by the correct answer data, or wherein the loss function is based on the third error.

According to this item, it is possible to generate the model capable of accurately inferring the target position.

The invention is not limited to the foregoing embodiments, and various variations/changes are possible within the spirit of the invention.

What is claimed is:

1. A learning apparatus for performing machine learning, comprising a memory storing instructions and a processor configured to execute the instructions to:

acquire teaching data including input data and correct answer data, the input data including an input image that contains a reference object and an input text that relatively designates a target position by referring to the reference object;

input the input data to a model to generate output data for specifying the target position, a reference position that is a position of the reference object, and a positional relationship of the target position with respect to the reference position; and update a parameter of the model to reduce a loss obtained by inputting the output data and the correct answer data to a loss function, wherein the loss function is based on at least two errors of a first error between the target position specified by the output data and the target position specified by the correct answer data, a second error between the reference position specified by the output data and the reference position specified by the correct answer data, and a third error between the positional relationship specified by the output data and the positional relationship specified by the correct answer data, and wherein the model includes an image encoding layer for encoding the input image, and a text encoding layer for encoding the input text, a part of features determined by the text encoding layer is input to the image encoding layer, and a part of features determined by the image encoding layer is input to the text encoding layer.

2. The learning apparatus according to claim 1, wherein the input image includes an image imaged by a camera of a vehicle.

3. The learning apparatus according to claim 1, wherein the input text is expressed by a natural language.

4. The learning apparatus according to claim 1, wherein the loss function is based on at least the first error.

5. The learning apparatus according to claim 1, wherein the loss function is based on all of the first error, the second error, and the third error.

6. The learning apparatus according to claim 1, wherein the image encoding layer and the text encoding layer have an identical layer structure.

7. The learning apparatus according to claim 1, wherein the machine learning of the model is first machine learning, and a parameter of the model at a start point in time of training is a parameter of the image encoding layer determined by second machine learning with the input image as input data and a position of the reference object as correct answer data.

8. A learning apparatus for performing machine learning, comprising a memory storing instructions and a processor configured to execute the instructions to:

acquire teaching data including input data and correct answer data, the input data including an input image that contains a reference object and an input text that relatively designates a target position by referring to the reference object;

generate output data for specifying the target position, a reference position that is a position of the reference object, and a positional relationship of the target position with respect to the reference position by inputting the input data to a model; and update a parameter of the model to reduce a loss obtained by inputting the output data and the correct answer data to a loss function, wherein the loss function is based on an error between the positional relationship specified by the output data and the positional relationship specified by the correct answer data, and wherein the model includes an image encoding layer for encoding the input image, and a text encoding layer for encoding the input text, a part of features determined by the text encoding layer is input to the image encoding layer, and a part of features determined by the image encoding layer is input to the text encoding layer.

9. A non-transitory computer readable storage medium for storing a program causing a computer to function as the learning apparatus according to claim 1.

10. A learning method of performing machine learning, comprising:

acquiring teaching data including input data and correct answer data, the input data including an input image that contains a reference object and an input text that relatively designates a target position by referring to the reference object;

inputting the input data to a model to generate output data for specifying the target position, a reference position that is a position of the reference object, and a positional relationship of the target position with respect to the reference position; and updating a parameter of the model to reduce a loss obtained by inputting the output data and the correct answer data to a loss function, wherein the loss function is based on at least two errors of a first error between the target position specified by the output data and the target position specified by the correct answer data, a second error between the reference position specified by the output data and the reference position specified by the correct answer data, and a third error between the positional relationship specified by the output data and the positional relationship specified by the correct answer data, or wherein the loss function is based on the third error, and wherein the model includes an image encoding layer for encoding the input image, and a text encoding layer for encoding the input text, a part of features determined by the text encoding layer is input to the image encoding layer, and a part of features determined by the image encoding layer is input to the text encoding layer.

* * * * *